US007700865B1

(12) United States Patent
Ho et al.

(10) Patent No.: US 7,700,865 B1
(45) Date of Patent: Apr. 20, 2010

(54) METHOD AND SYSTEM FOR MUSIC PROGRAM SELECTION

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 25 days.

(21) Appl. No.: 11/714,554

(22) Filed: Mar. 5, 2007

(51) Int. Cl.
*G01H 1/00* (2006.01)
*G01H 7/00* (2006.01)

(52) U.S. Cl. .................. 84/477 R; 84/601; 84/602; 84/604; 84/615; 84/647; 84/653

(58) Field of Classification Search ............... 84/477 R
See application file for complete search history.

(56) References Cited

U.S. PATENT DOCUMENTS

| 6,984,202 | B2 * | 1/2006 | Ashenden ................... 600/28 |
| 2002/0058239 | A1 * | 5/2002 | Wang ........................ 434/263 |
| 2003/0159567 | A1 * | 8/2003 | Subotnick .................... 84/626 |
| 2004/0003706 | A1 * | 1/2004 | Tagawa et al. ................ 84/609 |
| 2004/0237759 | A1 * | 12/2004 | Bill ............................. 84/668 |
| 2005/0098023 | A1 * | 5/2005 | Toivonen et al. .............. 84/615 |
| 2005/0210276 | A1 * | 9/2005 | Taruguchi .................... 713/193 |
| 2005/0223879 | A1 * | 10/2005 | Huffman ...................... 84/612 |
| 2007/0074619 | A1 * | 4/2007 | Vergo .......................... 84/612 |

\* cited by examiner

*Primary Examiner*—Jeffrey Donels
*Assistant Examiner*—Christopher Uhlir
(74) *Attorney, Agent, or Firm*—North Shore Patents, P.C.; Michele Liu Baillie

(57) ABSTRACT

In providing a music program, a personal music player displays personal activity choices. A user selects a personal activity and provides a time duration for the activity. The player sends a request to a music program server for a music program. The request includes the personal activity and the time duration. The music program server selects a music program record from a plurality of music program records that has an activity attribute which matches the personal activity and a program duration which matches or is less than the time duration. The server extracts location information for the music program from the program entry in the music program record, and sends this to the player. The player uses the location information to obtain the music program. In this manner, a music program is provided to a user based on the personal activity of the user.

30 Claims, 7 Drawing Sheets

METHOD AND SYSTEM FOR MUSIC PROGRAM SELECTION

BACKGROUND

1. Field

This invention relates generally to audio media, particularly to method and system for selecting a music program for a personal activity.

2. Related Arts

Personal music listening experience is fundamentally enhanced with the introduction of MP3 players. The large storage capacity, the ease of song downloading from a network, and the sophisticated capabilities of an MP3 player provide unprecedented choices in music selection. Additionally, the prolonged play time enabled by better power utilization of a MP3 player liberates a user to undertake a wide range of personal activities while listening to music, from taking a walk in the neighborhood, cooking a meal, working out in a gym, taking a 4-hour nature hike, taking a bath, to spending a long lazy afternoon lying on a campus lawn.

Nevertheless, a user oftentimes finds the new listening experience less than satisfying.

In one example, Melinda goes to a gym for her 45-minute workout session in mid afternoon. She likes to listen to fast tempo and spirited music numbers that goes with her favorite high workout intensity. Using her MP3 player, Melinda tries to find a XM satellite channel that provides the same. Unfortunately, all she can find is a slow pace religious music program.

In another example, Andy enjoys music while engaging in a variety of personal activities. In order to play the kind of music that complements the activity, Andy has to spend time to put together several playlists from the vast music collection in his MP3 player. In one instant, after a long and stressful day at work, Andy wants to unwind in his sauna and listen to some ambient soulful music. However, after shuffling through the directory of his music collection for 5 minutes, Andy is able to find only half a dozen songs, not quite enough to last for an hour of relaxing moment that he has in mind.

In one more example, John is taking a commuter train to work in downtown New York. From his music collection in his MP3 player, he plays Simon and Garfunkel's 1981 "The Concert in Central Park" to start his day. Unfortunately, when he arrives at his office building, the concert is barely half way through. John reluctantly stops the music and greets his co-workers, feeling unsatisfied for the rest of the morning.

The above discussion demonstrates the need for a solution to provide a music program based on the personal activity of a user.

SUMMARY

In providing a music program, a personal music player displays personal activity choices. A user selects a personal activity and provides a time duration for the activity. The player sends a request to a music program server for a music program. The request includes the personal activity and the time duration. The music program server selects a music program record from a plurality of music program records that has an activity attribute which matches the personal activity and a program duration which matches or is less than the time duration. The server extracts location information for the music program from the program entry in the music program record, and sends this to the player. The player uses the location information to obtain the music program. In this manner, a music program is provided to a user based on the personal activity of the user.

DETAILED DESCRIPTION

Figure 1A:
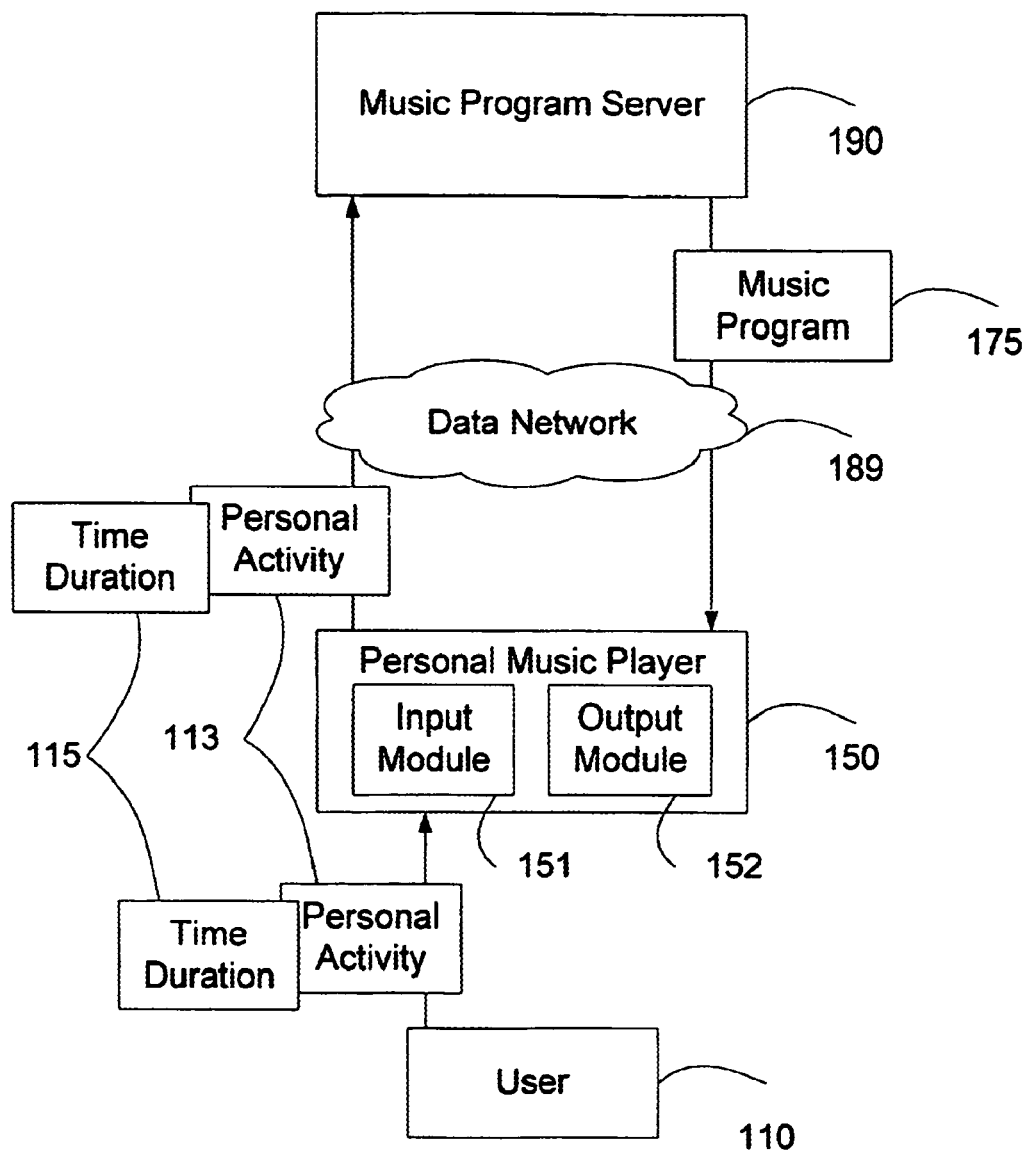
FIGS. 1a-1b illustrate a personal music player playing a music program during a personal activity.

FIG. 1a illustrates a personal music player playing a music program during a personal activity.

A user 110 uses a personal music player 150 to play a music program 175 while undertaking a personal activity 113 for time duration 115.

Music program 175 is encoded in an audio digital format, such as Moving Picture Experts Group 1 (MPEG-1 Level-3) also known as MP3, Windows Media Audio (WMA), Advanced Audio Coding (AAC), Apple Lossless Audio Codec (ALAC) Pulse Code Modulation (PCM), or Adaptive PCM (ADPCM) digital format.

In one embodiment, music program 175 is a recorded music program presented by a host, such as the weekly radio program "MusicDeli" produced by the ABC Radio National, "Jazztrack with Mal Stanley", or "Blueprint" hosted by Kevin Lincoln. In one embodiment, music program is a movie soundtrack such as Disney's "Chicken Little", "Rocky Horror Picture Show" produced by John Goldstone, James Stewart's classic "It's A Wonderful Life", or Kander and Ebb's musical "Chicago". In one embodiment, music program 175 is a recorded concert performance such as Simon and Garfunkel's 1981 "The Concert in Central Park", Elvis Presley's last live performance at Market Square Arena on Jul. 16, 1977, and Peter, Paul & Mary' 1988 reunion special "A Holiday Concert" produced by Public Broadcasting Service (PBS).

In one embodiment, music program 175 includes a song, such as John Lennon's "When I'm Sixty Four", Jennifer Lopez's "Let's Get Loud", Bob Dylan's "Times They Are A-changing", or Paul Simon and Art Garfunkel's "The Boxer" performed in New York City's Central Park in September 1981. In one embodiment, music program 175 includes an instrumental, such as Kenny G's "Forever In Love", Chopin's "Concerto in F Minor" or Pink Floyd's "Comfortably Numb" performed by David Gilmour. In one embodiment, music program 175 includes comment or annotation by the host about an included song or instrumental, such as the background of the composer or performer, the occasion of the performance, or the musical characteristics. In one embodiment, the comment or annotation is before, after, or during an included song or instrumental.

Personal music player 150 is a mobile audio device for personal music listening. In one embodiment, user 110 carries personal music player 150 in a shirt pocket, a purse or a backpack. In one embodiment, user 110 wears personal music player 150 in an armband. In one embodiment, user 110 wears personal music player 150 as part of a headset. Personal music player 150 is capable of playing music program 175.

In one embodiment, personal activity 113 is taking a walk during a break. In one embodiment, personal activity 113 is cooking a dinner. In one embodiment, personal activity 113 is a work out session in a gym. In one embodiment, personal activity 113 is a meditating session after work. In one embodiment, personal activity 113 is morning commuting to work. In one embodiment, personal activity 113 is studying in a library after school. In one embodiment, personal activity 113 is reading before bedtime, knitting after supper, taking a shower, taking a bath, gardening, a 5-mile jog, or doing nothing for an hour.

In one embodiment, time duration 115 of personal activity 113 is 40 minutes, 45 minutes, 2 hours, or 10 minutes.

Music program 175 lasts for a period of time close to time duration 115. In one embodiment, music program 175 lasts for 15 minutes, 42 minutes, 60 minutes, 20 minutes or 4 minutes 32 seconds.

Personal music player 150 includes output module 152 for playing music program 175. In one embodiment, output module 152 includes a wired headset. In one embodiment, output module 152 includes a wireless headset, such as a Bluetooth headset. In one embodiment, the wireless headset is based on other technologies such as Wi-Fi, Wibree, ZigBee or Frequency Modulation (FM) technology. In one embodiment, output module 152 includes a speaker.

Personal music player 150 includes input module 151 for user 110 to enter information about personal activity 113 and time duration 115. In one embodiment, input module 151 includes a touch wheel, a touchscreen, a keypad, a keyboard or a stylus. In one embodiment, input module 151 includes a microphone and speech recognition capabilities.

In one embodiment, user 110 uses input module 151 to enter a phrase such as "weight lifting workout session" or "reading a book". Personal music player 150 determines personal activity 113 based on the entered information. In one more embodiment, user 110 speaks the phrase at the microphone in input module 151.

Figure 1B:
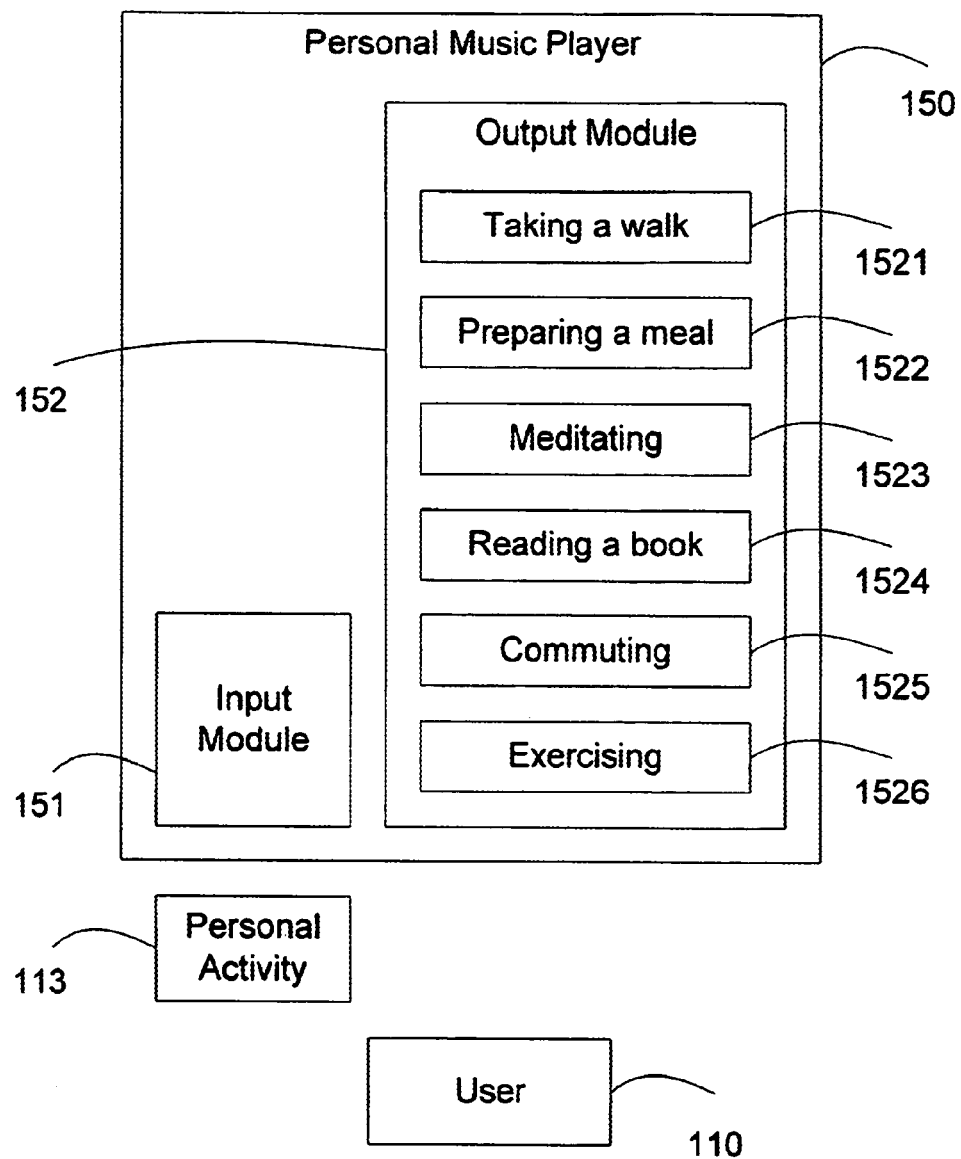

In one embodiment, output module 152 includes a graphical display. Personal music player 150 displays a plurality of personal activity choices at output module 152, allowing user 110 to select personal activity 113 from the list of choices using input module 151. In one example, as illustrated in FIG. 1b, personal music player 150 displays personal activity choices of "taking a walk" 1521, "preparing a meal" 1522, "meditating" 1523, "reading a book" 1524", commuting "1525" and "exercising" 1526. User 110 uses input module 151 to select one of the choices as personal activity 113. In one embodiment, user 110 uses the stylus in input module 151 to select one of the choices.

In one embodiment, personal music player 150 displays a plurality of time duration choices at output module 152, allowing user 110 to select time duration 115 from the list of choices. In one example, personal music player 150 displays time duration choices of "25 minutes", "45 minutes", "1 hour", and "1 hour 20 minutes". User 110 uses input module 151 to select one of the choices as time duration 115.

In one embodiment, user 110 uses input module 151 to enter a time, such as "43 min" or "1 hour 10 minutes". Personal music player 150 determines time duration 115 based on the entered information.

Personal music player 150 connects to a music program server 190. In one embodiment, personal music player 150 connects to music program service 190 over a data network 189. In one embodiment, personal music player 150 includes music program server 190.

In one embodiment, data network 189 includes the Internet. In one embodiment, data network 189 includes an Internet service provider network. In one embodiment, data network 189 includes a broadband network based on Digital Subscriber Line (DSL) or cable modem technology. In one embodiment, data network 189 includes a cellular based data network such as General Packet Radio Service (GPRS) network, CDMA2000 network, Wideband Code Division Multiple Access (W-CDMA) network, or third-generation (3G) network. In one embodiment, data network 189 includes a private network of a business entity, such as a fitness center, a hotel, a café, or an airport. In one embodiment, data network 189 includes a home network. In one embodiment, data network 189 includes a hotspot WiFi network.

Personal music player 150 requests music program server 190 for a music program. Personal music player 150 provides personal activity 113 and time duration 115 to music program server 190. In one embodiment, personal music player 150 provides personal activity 113 and time duration 115 using a Hypertext Transfer Protocol (HTTP) message. In one embodiment, personal music player 150 provides personal activity 113 and time duration 115 in a Remote Method Innovation (RMI) message. In one embodiment, personal music player 150 provides personal activity 113 and time duration 115 over an Application Programming Interface (API).

Music program server 190 determines music program 175 based on personal activity 113 and time period 115. Music program server 190 sends information for music program 175 to personal music player 150. In one embodiment, music program server 190 sends music program 175 to personal music player 150.

Figure 2:
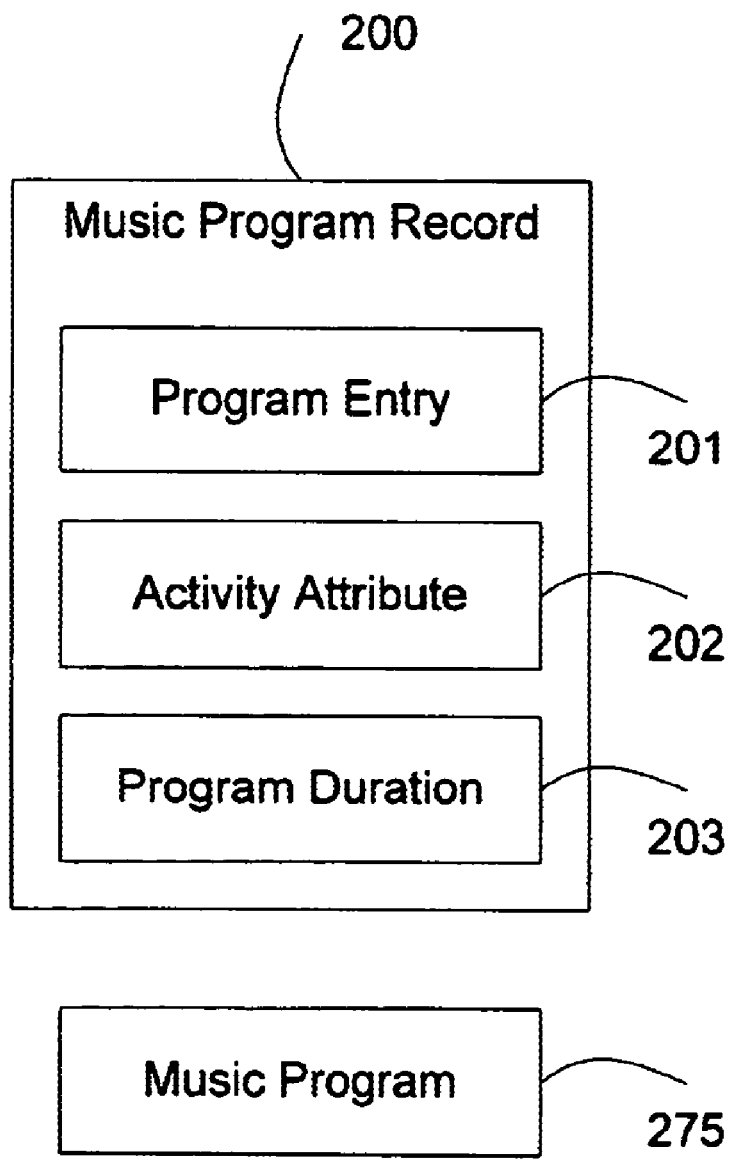
FIG. 2 illustrates a music program record.

FIG. 2 illustrates a music program record.

A music program record 200 includes a program entry 201, an activity attribute 202, and a program duration 203.

Program entry 201 includes location information for obtaining music program 275. In one embodiment, the location information is a Web Universal Resource Identifier (URI), such as http://www.musicprogram.com/softrock/musicdeli/4352.mp3. In one embodiment, the location information includes an URI based on Real Time Streaming Protocol (RTSP), such as rtsp://emusic.com/8997A9Y82.sdp. In one embodiment, the location information is a file name.

Activity attribute 202 indicates a personal activity, such a "taking a walk", "cooking", "commuting", "taking a bath" or "jogging".

Program duration 203 is a time period of music program 275 such as 45 minutes, 60 minutes or 22 minutes.

Figure 3A:
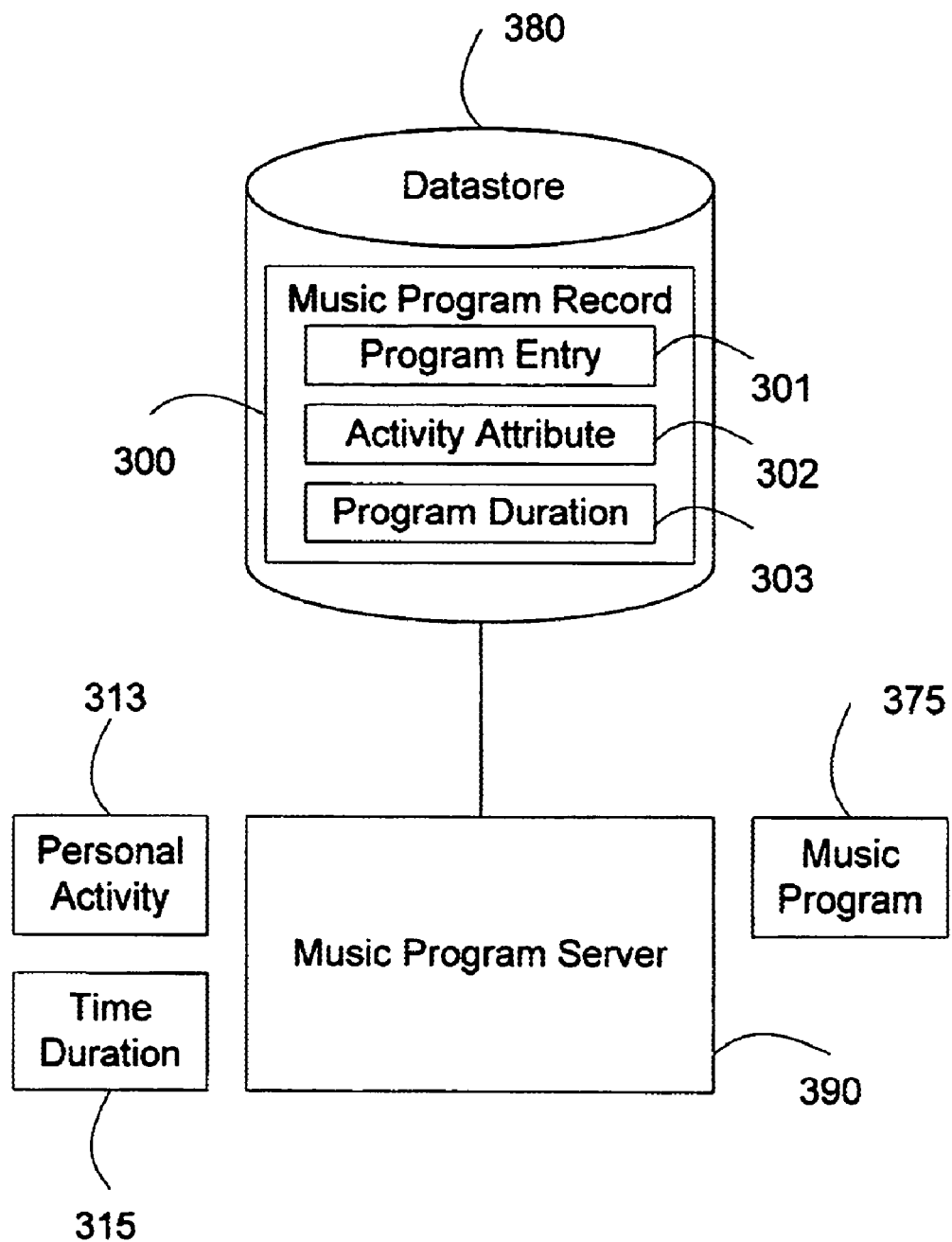
FIG. 3a illustrates a process to determine a music program.

FIG. 3a illustrates a process to determine a music program.

Music program server 390 determines music program 375 based on personal activity 313 and time duration 315.

Music program server 390 connects to a datastore 380. Datastore 380 stores a plurality of music program records that includes music program record 300. In one embodiment, datastore 380 includes a hard disk, a flash memory. In one embodiment, datastore 380 includes a database. In one embodiment, music program server 390 includes datastore 380.

Music program record 300 includes program entry 301, activity attribute 302 and program duration 303.

Music program server 390 selects music program record 300 wherein activity attribute 302 matches personal activity 313, and program duration 303 matches time duration 315.

In one embodiment, music program server 390 determines that activity attribute 302 matches personal activity 313 if activity attribute 302 relates to personal activity 313. In one example, activity attribute 302 includes "cooking" and personal activity 313 is "cooking a dinner". In one example, activity attribute 302 is a synonym related to personal activity 313. For example, activity attribute 302. is "making a sandwich", "preparing a meal", or "home cooking".

In one embodiment, music program server 390 determines that program duration 303 matches time duration 315 if program duration 303 is smaller than time duration 315. In one example, program duration 303 is 42 minutes and time duration 315 is 50 minutes. In another embodiment, music program server 390 determines that program duration 303 matches time duration 315 if the difference between program duration 303 and time duration 315 is less than a pre-determined value, such as 3 minutes, 5 minutes, or 6 minutes. In one example, program duration 303 is 63 minutes and time duration 315 is 60 minutes. In one embodiment, music program server 390 determines that program duration 303 matches time duration 315 if the difference between program duration 303 and time duration 315 is within 10%, 15%, or 20% of time duration 315.

Figure 3B:
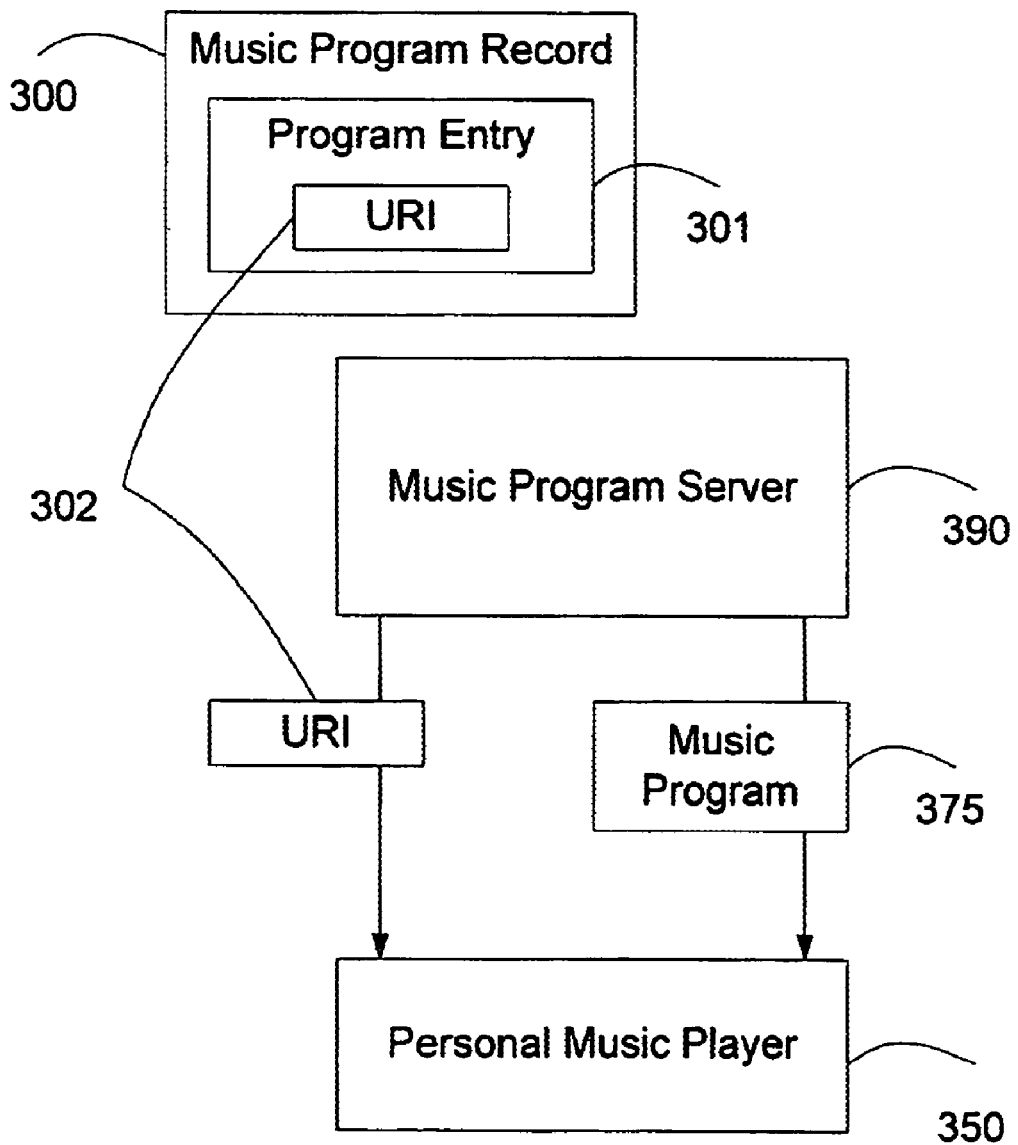
FIG. 3b illustrates a process to deliver a music program.

FIG. 3b illustrates a process to deliver a music program.

Music program server 390 extracts location information for music program 375 from program entry 301. Music program server 390 sends the location information to personal music player 350.

In one embodiment, the location information is URI 302. Music program server 390 sends URI 302 to personal music player 350. Personal music player 350 uses URI 302 to obtain music program 375.

In one embodiment, URI 302 is an RTSP-based URL Personal music player 350 uses the RTSP-based URI to stream music program 375 from music program server 390. In one embodiment, personal music player 350 streams music program 375 from a different server. Personal music player 350 plays music program 375 while streaming music program 375.

In one embodiment, URI 302 is an FTP-based URI. Personal music player 350 uses the FTP-based URI to obtain music program 375 in the form of an audio file, such as an MP3 file, a WMA file, and AAC file, an Audio Video Interleave (AVI) file, or a Waveform (WAV) file. In one embodiment, personal music player 350 plays music program 375 after obtaining music program 375 in the entirety.

In one embodiment, personal. music player 350 includes a storage. The storage stores music program 375. In one embodiment, the storage is a flash drive, a hard disk drive, or a removable memory based on Universal Serial Bus (USB) or Secure Digital Card technology. In one embodiment, program entry 301 includes a title for music program 375. Music program server 390 sends music program 375 title to personal music player 350. Personal music player 350 retrieves music program 375 from the storage based on music program 375 title.

Figure 4A:
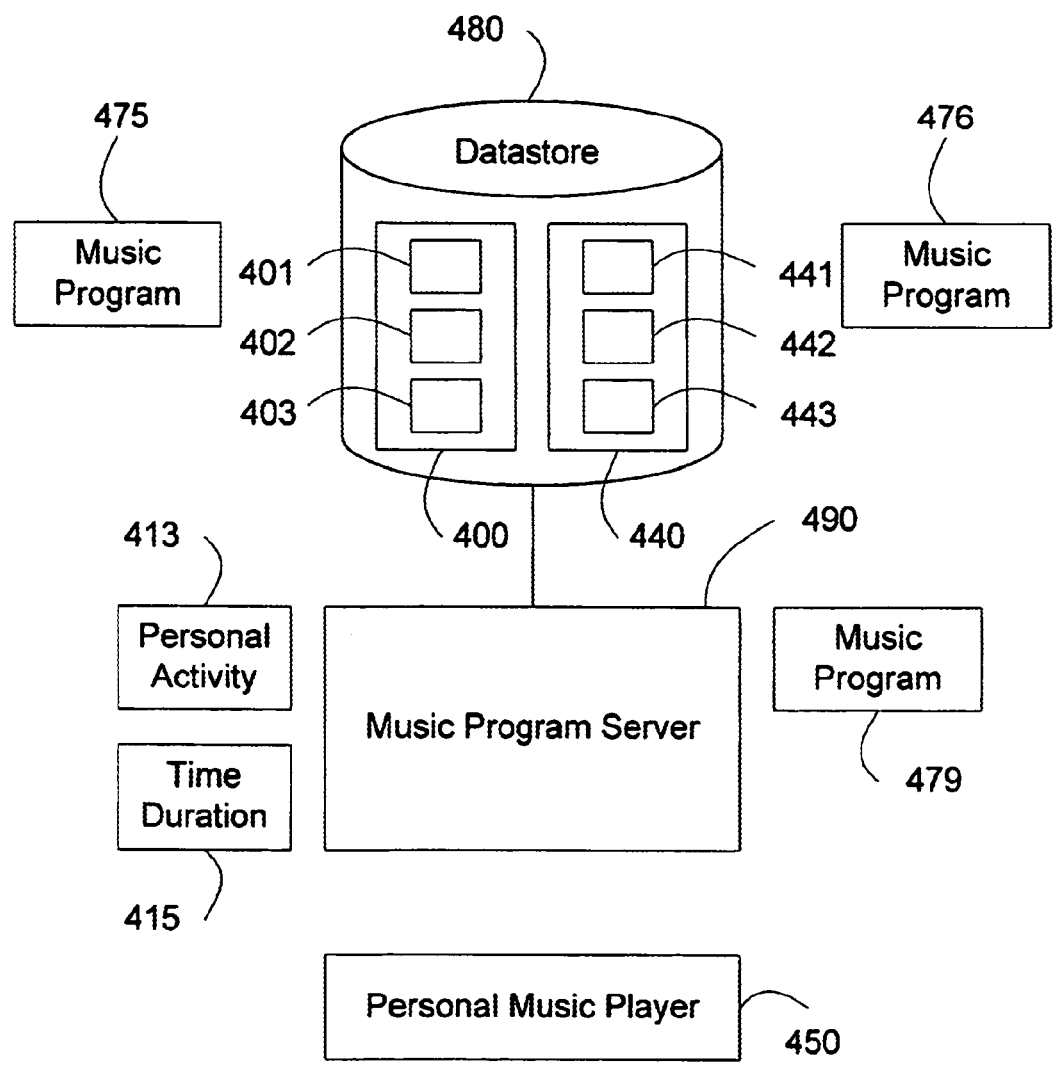
FIGS. 4a-4b illustrate a process to determine and deliver two or more music programs.

FIG. 4a illustrates a process to determine and deliver two or more music programs.

Music program server 490 determines music program 479 based on personal activity 413 and time duration 415. Music program 479 includes a plurality of two or more music programs.

In one embodiment, music program 479 includes music program 475 and music program 476. In one embodiment, music program server 490 connects to datastore 480, and datastore 480 includes music program records 400 and 440. Music program record 400 includes program entry 401, activity attribute 402 and program duration 403. Music program record 440 includes program entry 441, activity attribute 442 and program duration 443. Program entry 401 includes location information for music program 475 and program entry 441 includes location information for music program 476.

Music program server 490 selects music program records 400 and 440 wherein both activity attributes 402 and 442 match personal activity 413, and wherein the sum of program durations 403 and 443 match time duration 415. In one embodiment, the sum of program durations 403 and 443 matches time duration 415 if the sum is shorter than time duration 415. In another embodiment, the sum matches time duration 415 if the difference between the sum and time duration 415 is less than a pre-determined value; or if the difference between the sum and time duration 415 is within 10%, 15%, or 20% of time duration 415.

In one embodiment, music program server 490 extracts first location information for music program 475 from program entry 401 and extracts second location information for music program 476 from program entry 441. Music program 479 includes the first location information and the second location information.

In one embodiment, music program 479 is a Hypertext Markup Language (HTML) file that includes the first location information and the second location information. Music program server 490 generates music program 479, and sends music program 479 to personal music player 450. Personal music player 450 uses the first location information to obtain music program 475 and the second location information to obtain music program 476. In one embodiment, personal music player 450 plays music program 476 after playing music program 475.

In a different embodiment, music program server 490 generates music program 479 by combining music programs 475 and 476. Music program server 490 sends location information for music program 479 as described in FIG. 3b.

Figure 4B:
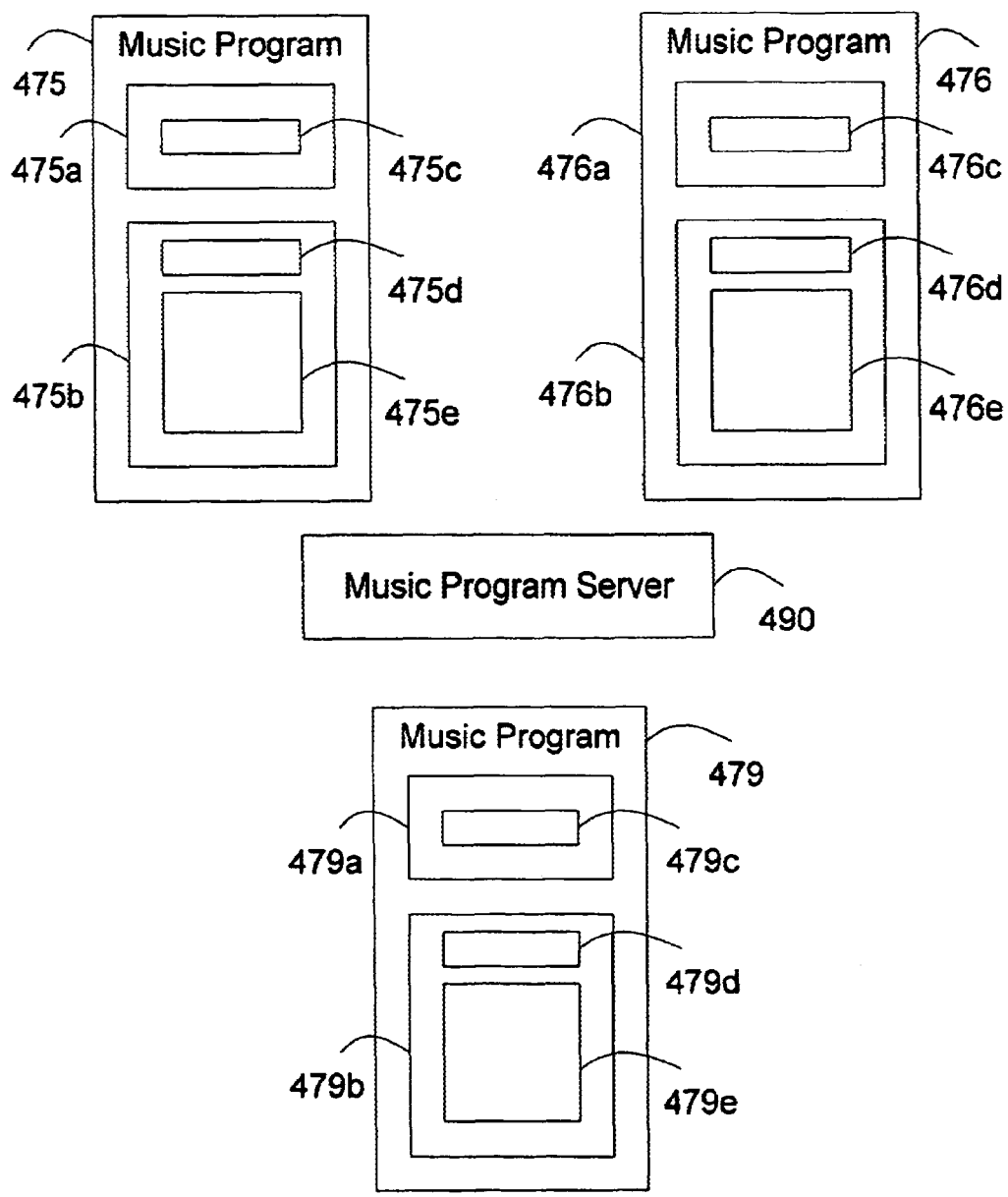

In one embodiment, music programs 475 and 476 are audio files in a common audio digital format, such as Waveform Audio format (WAV) files with audio data encoded in uncompressed 16-bit mono Pulse Code Modulation (PCM) format at a sample rate of 44,100. As illustrated in FIG. 4b, music program 475 includes header 475a and data chunk 475b. Header 475a includes chunk size 475c and audio data format information. Data chunk 475b includes data chunk size 475d and audio data 475e. Likewise, music program 476 includes header 476a, chunk size 476c, data chunk 476b, data chunk size 476d and audio data 476e.

Music program server 490 combines data chunk 475b and data chunk 476b into data chunk 479b of music program 479. Music program server 490 stores audio data 475e into audio data 479e of music program 479, and then appends audio data 476e to audio data 479e. Music program server 490 computes data chunk size 479d of music program 479 as the sum of data chunk size 475d and data chunk Size 476d.

Header 475a and header 476a are similar with a possible difference in chunk size 475c and chunk size 476c. Music program server 490 copies header 475a into header 479a of music program 479, and computes chunk size 479c of music program 479. In one embodiment, music program server 490 computes chunk size 479c as the file size of music program 479. In another embodiment, Music program server 490 computes chunk size 479c as the file size of music program 479 starting after the location of chunk size 479c in the file.

In one embodiment, music program server 490 inserts a plurality of audio data before appending audio data 476e in 479e of music program 479. In one embodiment, the inserted audio data represents silence for a period of time, such as 3 seconds, 5 seconds, or 22 milli-seconds. In one embodiment, the inserted audio data include a music interlude. Music program server 490 computes data chunk size 479d and chunk size 479c accordingly.

In one embodiment, the audio digital formats of music programs 475 and 476 are different; music program server 490 converts music programs 475 and 476 to a common audio digital format before generating music program 479.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for providing a music program to be played by a personal music player, comprising:
   (a) determining a personal activity for a user and a time duration of the personal activity, wherein the personal activity comprises an activity in which the user will be engaged in a future concurrently with listening to the music program, wherein the personal activity is unrelated to user interaction with any personal music player;
   (b) sending a request for the music program to a music program server, wherein the request comprises the personal activity and the time duration, wherein the music program server:
      (b1) selects at least a first music program record corresponding to a first music program and a second music program record corresponding to a second music program, wherein activity attributes of the first and second music program records are synonyms of the personal activity and a sum of program time durations of the first and second music program records is equal to or less than the time duration of the personal activity,
      (b2) combines the first music program and the second music program into a separate combined music program, wherein the first music program comprises a first header comprising a first chunk size and a first audio data format information, and a first data chunk comprising a first data chunk size and a first audio data,
         wherein the second music program comprises a second header comprising a second chunk size and a second audio data format information, and a second data chunk comprising a second data chunk size and a second audio data, wherein the combines comprises:
         (b2i) combines the first data chunk and the second data chunk into a data chunk of the combined music program,
         (b2ii) stores the first audio data into an audio data of the combined music program and appending the second audio data to the audio data of the combined music program, and
         (b2iii) computes a combined data chunk size of the combined music program as a sum of the first data chunk size and the second data chunk size; and
   (c) receiving location information for the combined music program from the music program server.

2. The method of claim 1, wherein the determining (a) comprises:
   (a1) receiving an input of the personal activity from the user.

3. The method of claim 1, wherein the determining (a) comprises:
   (a1) displaying a plurality of personal activities; and
   (a2) receiving a selection of the personal activity from the user.

4. The method of claim 1, further comprising:
   (d) obtaining the combined music program using the location information.

5. A personal music player, comprising:
   an input module for receiving a personal activity for a user and a time duration of the personal activity, wherein a request for a music program is sent to a music program server, wherein the request comprises the personal activity and the time duration, wherein the personal activity comprises an activity in which the user will be engaged in a future concurrently with listening to the music program, wherein the personal activity is unrelated to user interaction with any personal music player, wherein the music program server:
      selects at least a first music program record corresponding to a first music program and a second music program record corresponding to a second music program, wherein activity attributes of the first and second music program records are synonyms of the personal activity and a sum of program time durations of the first and second music program records is equal to or less than the time duration of the personal activity,
      combines the first music program and the second music program into a separate combined music program, wherein the first music program comprises a first header comprising a first chunk size and a first audio data format information, and a first data chunk comprising a first data chunk size and a first audio data,
      wherein the second music program comprises a second header comprising a second chunk size and a second audio data format information, and a second data chunk comprising a second data chunk size and a second audio data, wherein the combines comprises:
         combines the first data chunk and the second data chunk into a data chunk of the combined music program,
         stores the first audio data into an audio data of the combined music program and appending the second audio data to the audio data of the combined music program, and
         computes a combined data chunk size of the combined music program as a sum of the first data chunk size and the second data chunk size,
      wherein location information for the combined music program is received from the music program server.

6. The player of claim 5, wherein the input module comprises means for receiving an input of the personal activity from the user.

7. The player of claim 5, further comprising an output module for displaying a plurality of personal activities, wherein the input module receives a selection of the personal activity from the user.

8. The player of claim 5, wherein the location information comprises information used in obtaining the combined music program.

9. A computer readable storage medium with program instructions for providing a music program to be played by a personal music player, wherein when the program instructions are executed by a computer, causes the computer to:
   (a) determine a personal activity for a user and a time duration of the personal activity, wherein the personal activity comprises an activity in which the user will be engaged in a future concurrently with listening to the music program, wherein the personal activity is unrelated to user interaction with any personal music player;

(b) send a request for the music program to a music program server, wherein the request comprises the personal activity and the time duration, wherein the music program server:
- (b1) selects at least a first music program record corresponding to a first music program and a second music program record corresponding to a second music program, wherein activity attributes of the first and second music program records are synonyms of the personal activity and a sum of program time durations of the first and second music program records is equal to or less than the time duration of the personal activity,
- (b2) combines the first music program and the second music program into a separate combined music program, wherein the first music program comprises a first header comprising a first chunk size and a first audio data format information, and a first data chunk comprising a first data chunk size and a first audio data,
    wherein the second music program comprises a second header comprising a second chunk size and a second audio data format information, and a second data chunk comprising a second data chunk size and a second audio data, wherein the combines comprises:
    - (b2i) combines the first data chunk and the second data chunk into a data chunk of the combined music program,
    - (b2ii) stores the first audio data into an audio data of the combined music program and appending the second audio data to the audio data of the combined music program, and
    - (b2iii) computes a combined data chunk size of the combined music program as a sum of the first data chunk size and the second data chunk size; and
- (c) receive location information for the combined music program from the music program server.

10. A method for providing a music program to be played by a personal music player, comprising:
- (a) receiving a request from the personal music player for the music program, wherein the request comprises a personal activity for a user and a time duration for the personal activity, wherein the personal activity comprises an activity in which the user will be engaged in a future concurrently with listening to the music program, wherein the personal activity is unrelated to user interaction with any personal music player;
- (b) selecting at least a first music program record corresponding to a first music program and a second music program record corresponding to a second music program, wherein activity attributes of the first and second music program records are synonyms of the personal activity and a sum of the program time durations of the first and second music program records are less than or equal to the time duration of the personal activity;
- (c) combining the first music program and the second music program into a separate combined music program, wherein the first music program comprises a first header comprising a first chunk size and a first audio data format information, and a first data chunk comprising a first data chunk size and a first audio data,
wherein the second music program comprises a second header comprising a second chunk size and a second audio data format information, and a second data chunk comprising a second data chunk size and a second audio data_ wherein the combining comprises:
    - (c1) combining the first data chunk and the second data chunk into a data chunk of the combined music program,
    - (c2) storing the first audio data into an audio data of the combined music program and appending the second audio data to the audio data of the combined music program, and
    - (c3) computing a combined data chunk size of the combined music program as a sum of the first data chunk size and the second data chunk size; and
- (ed) sending location information for the combined music program to the personal music player.

11. The method of claim 10, wherein the personal music player obtains the combined music program using the location information.

12. The method of claim 10, wherein the selecting (b) comprises:
- (b1) connecting to a datastore, wherein the datastore comprises a plurality of music program records corresponding to a plurality of music programs, wherein each record comprises a program entry comprising the location information for obtaining the corresponding music program, an activity attribute, and a program time duration.

13. The method of claim 12, wherein the combining (c) further comprises:
- (c4) extracting a first location information for the first music program from a program entry of the first music program record;
- (c5) extracting a second location information for the second music program from a program entry of the second music program record; and
- (c6) generating the location information for the combined music program, wherein the location information comprises the first location information and the second location information.

14. The method of claim 13, wherein the personal music player obtains the combined music program using the first location information and the second location information.

15. A system, comprising:
- a datastore comprising a plurality of music program records corresponding to a plurality of music programs, wherein each record comprises a program entry comprising location information for obtaining a corresponding music program, an activity attribute, and a program time duration; and
- a music program server, wherein the music program server:
    receives a request from a personal music player for the music program, wherein the request comprises a personal activity for a user and a time duration of the personal activity, wherein the personal activity comprises an activity in which the user will be engaged in a future concurrently with listening to the music program, wherein the personal activity is unrelated to user interaction with any personal music player,
    selects at least a first music program record corresponding to a first music program and a second music program record corresponding to a second music program, wherein the activity attributes of the first and second music program records are synonyms of the personal activity and a sum of the program time durations of the first and second music program records are equal to or less than the time duration of the personal activity,
    combines the first music program and the second music program into a separate combined music program, wherein the first music program comprises a first header comprising a first chunk size and a first audio data format information, and a first data chunk comprising a first data chunk size and a first audio data, wherein the second music program comprises a second header comprising a second chunk size and a second audio data format information, and a second data chunk comprising a second data chunk size and a second audio data, wherein the music server:

combines the first data chunk and the second data chunk into a data chunk of the combined music program, stores the first audio data into an audio data of the combined music program and appending the second audio data to the audio data of the combined music program, and computes a combined data chunk size of the combined music program as a sum of the first data chunk size and the second data chunk size.

16. A computer readable storage medium with program instructions for providing a music program to be played by a personal music player, wherein when the program instructions are executed by a computer, causes the computer to:

(a) receive a request from the personal music player for the music program, wherein the request comprises a personal activity for a user and a time duration of the personal activity, wherein the personal activity comprises an activity in which the user will be engaged in a future concurrently with listening to the music program, wherein the personal activity is unrelated to user interaction with any personal music player;

(b) select at least a first music program record corresponding to a first music program and a second music program record corresponding to a second music program, wherein activity attributes of the first and second music program records are synonyms of the personal activity and a sum of the program time durations of the first and second music program records are less than or equal to the time duration of the personal activity;

(c) combine the first music program and the second music program into a separate combined music program, wherein the first music program comprises a first header comprising a first chunk size and a first audio data format information, and a first data chunk comprising a first data chunk size and a first audio data, wherein the second music program comprises a second header comprising a second chunk size and a second audio data format information, and a second data chunk comprising a second data chunk size and a second audio data, wherein the combine comprises:

(c1) combine the first data chunk and the second data chunk into a data chunk of the combined music program, (c2) store the first audio data into an audio data of the combined music program and appending the second audio data to the audio data of the combined music program, and (c3) compute a combined data chunk size of the combined music program as a sum of the first data chunk size and the second data chunk size; and (ed) send location information for the combined music program to the personal music player.

17. The method of claim 1, wherein the time duration is a length of time the user will be engaged in the personal activity.

18. The player of claim 5, wherein the time duration is a length of time the user will be engaged in the personal activity.

19. The method of claim 10, wherein the time duration is a length of time the user will be engaged in the personal activity.

20. The system of claim 15, wherein the time duration is a length of time the user will be engaged in the personal activity.

21. The method of claim 1, wherein the personal activity comprises a physical exercise activity in which the user will be engaged in the future concurrently with listening to the music program, wherein the physical exercise activity does not pertain to the user interaction with any personal music player.

22. The method of claim 1, wherein the personal activity comprises a cooking activity in which the user will be engaged in the future concurrently with listening to the music program.

23. The method of claim 1, wherein the personal activity comprises a commuting activity in which the user will be engaged in the future concurrently with listening to the music program.

24. The method of claim 1, wherein the personal activity comprises a reading activity in which the user will be engaged in the future concurrently with listening to the music program.

25. The method of claim 1, wherein the personal activity comprises a meditation activity in which the user will be engaged in the future concurrently with listening to the music program.

26. The method of claim 1, wherein the personal activity comprises a hobby activity in which the user will be engaged in the future concurrently with listening to the music program, wherein the hobby activity is unrelated to the user interaction with any personal music player.

27. The method of claim 1, wherein the personal activity comprises a personal grooming activity in which the user will be engaged in the future concurrently with listening to the music program.

28. The method of claim 1, wherein the personal activity comprises a relaxation activity in which the user will be engaged in the future concurrently with listening to the music program, wherein the relaxation activity is unrelated to the user interaction with the personal music player.

29. A method for providing a music program to be played by a personal music player, comprising:

(a) determining a personal activity for a user and a time duration of the personal activity, wherein the personal activity comprises an activity in which the user will be engaged in a future concurrently with listening to the music program, wherein the personal activity is unrelated to user interaction with any personal music player, wherein the personal activity comprises at least one of the following: a physical exercise activity, a cooking activity, a commuting activity, a reading activity, a meditation activity, a hobby activity, a personal grooming activity, and a relaxation activity;

(b) sending a request for the music program to a music program server, wherein the request comprises the personal activity and the time duration, wherein the music program server:

(b1) selects at least a first music program record corresponding to a first music program and a second music program record corresponding to a second music program, wherein activity attributes of the first and second music program records are synonyms of the personal activity and a sum of program time durations of the first and second music program records is equal to or less than the time duration of the personal activity, (b2) combines the first music program and the second music program into a separate combined music program, wherein the first music program comprises a first header comprising a first chunk size and a first audio data format information, and a first data chunk comprising a first data chunk size and a first audio data, wherein the second music program comprises a second header comprising a second chunk size and a second audio data format information, and a second data chunk comprising a second data chunk size and a second audio data, wherein the combines comprises:

(b2i) combines the first data chunk and the second data chunk into a data chunk of the combined music program, (b2ii) stores the first audio data into an audio data of the combined music program and appending the second audio data to the audio data of the combined music program, and (b2iii) computes a combined data chunk size of the combined music program as a sum of the first data chunk size and the second data chunk size; and (c) receiving location information for the combined music program from the music program server.

30. A method for providing a music program to be played by a personal music player, comprising:

(a) receiving a request from the personal music player for the music program, wherein the request comprises a personal activity for a user and a time duration for the personal activity, wherein the personal activity comprises an activity in which the user will be engaged in a future concurrently with listening to the music program, wherein the personal activity is unrelated to user interaction with any personal music player;

(b) connecting to a datastore, wherein the datastore comprises a plurality of music program records corresponding to a plurality of music programs, wherein each record comprises a program entry comprising location information for obtaining the corresponding music program, an activity attribute, and a program time duration;

(c) selecting at least a first music program record corresponding to a first music program and a second music program record corresponding to a second music program, wherein the activity attributes of the first and second music program records are synonyms of the personal activity and a sum of the program time durations of the first and second music program records is equal to or less than the time duration of the personal activity; and (d) combining the first music program and the second music program into a separate combined music program, wherein the first music program comprises a first header comprising a first chunk size and a first audio data format information, and a first data chunk comprising a first data chunk size and a first audio data, wherein the second music program comprises a second header comprising a second chunk size and a second audio data format information, and a second data chunk comprising a second data chunk size and a second audio data, wherein the combining comprises:

(d1) combining the first data chunk and the second data chunk into a data chunk of the combined music program, (d2) storing the first audio data into an audio data of the combined music program and appending the second audio data to the audio data of the combined music program, and (d3) computing a combined data chunk size of the combined music program as a sum of the first data chunk size and the second data chunk size.

* * * * *